United States Patent
Robinson

(10) Patent No.: US 7,472,190 B2
(45) Date of Patent: Dec. 30, 2008

(54) METHOD, SYSTEM AND PROGRAM PRODUCT FOR PRESERVING A USER STATE IN AN APPLICATION

(75) Inventor: Gerald R. Robinson, Elmira, NY (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 10/688,038

(22) Filed: Oct. 17, 2003

(65) Prior Publication Data

US 2005/0086323 A1    Apr. 21, 2005

(51) Int. Cl.
G06F 13/00    (2006.01)
(52) U.S. Cl. ............... 709/225; 709/219; 709/224; 709/227
(58) Field of Classification Search ............ 709/217, 709/219, 223, 224, 225, 227; 707/10
See application file for complete search history.

(56) References Cited

U.S. PATENT DOCUMENTS

| | | | |
|---|---|---|---|
| 6,035,399 A * | 3/2000 | Klemba et al. ............... 726/1 |
| 6,105,148 A * | 8/2000 | Chung et al. ............... 714/16 |
| 6,167,433 A | 12/2000 | Maples et al. |
| 6,789,085 B2 * | 9/2004 | Sturms et al. ............ 707/102 |
| 6,795,966 B1 * | 9/2004 | Lim et al. ................. 718/1 |
| 6,957,237 B1 * | 10/2005 | Traversat et al. ......... 707/206 |
| 7,165,186 B1 * | 1/2007 | Viswanatham et al. ...... 714/1 |
| 7,213,246 B1 * | 5/2007 | van Rietschote et al. .... 718/1 |
| 2002/0051541 A1 * | 5/2002 | Glick et al. ............. 380/258 |
| 2002/0156800 A1 * | 10/2002 | Ong ..................... 707/203 |
| 2003/0074636 A1 * | 4/2003 | Manepalli ............... 715/513 |
| 2003/0233361 A1 * | 12/2003 | Cady ..................... 707/10 |
| 2004/0221231 A1 * | 11/2004 | Madril et al. ........... 715/527 |
| 2005/0192963 A1 * | 9/2005 | Tschiegg et al. ........... 707/9 |

* cited by examiner

*Primary Examiner*—Viet Vu
(74) *Attorney, Agent, or Firm*—William E. Schiesser; Hoffman Warnick LLC

(57) ABSTRACT

Under the present invention, milestones or points of closure are provided at predetermined locations within a workflow of an application. Typically, the milestones are provided at completion points of tasks in the workflow. To this extent, as the user proceeds through the workflow, he/she is associated with the milestones corresponding thereto. The associations are stored (optionally with any corresponding data) in a persistent storage. In the event of a failure, the milestone associations are used to transport the user back to the last milestone with which he/she was associated.

7 Claims, 3 Drawing Sheets

| NAME | JOE SMITH |
|---|---|
| ADDRESS | 123 SMITH LANE<br>SMITH, NY 11111 | ← 52
| TEL NUMBER | 555-555-1414 |
| DATE OF BIRTH | 05/08/1973 |

◇ 56

| CARD TYPE | MASTERCARD ▼ |
|---|---|
| CARD NO. | XXXXXXXXXX | ← 54
| EXP. DATE | 06/16 |
| NAME ON CARD | JOE SMITH |

◇ 58

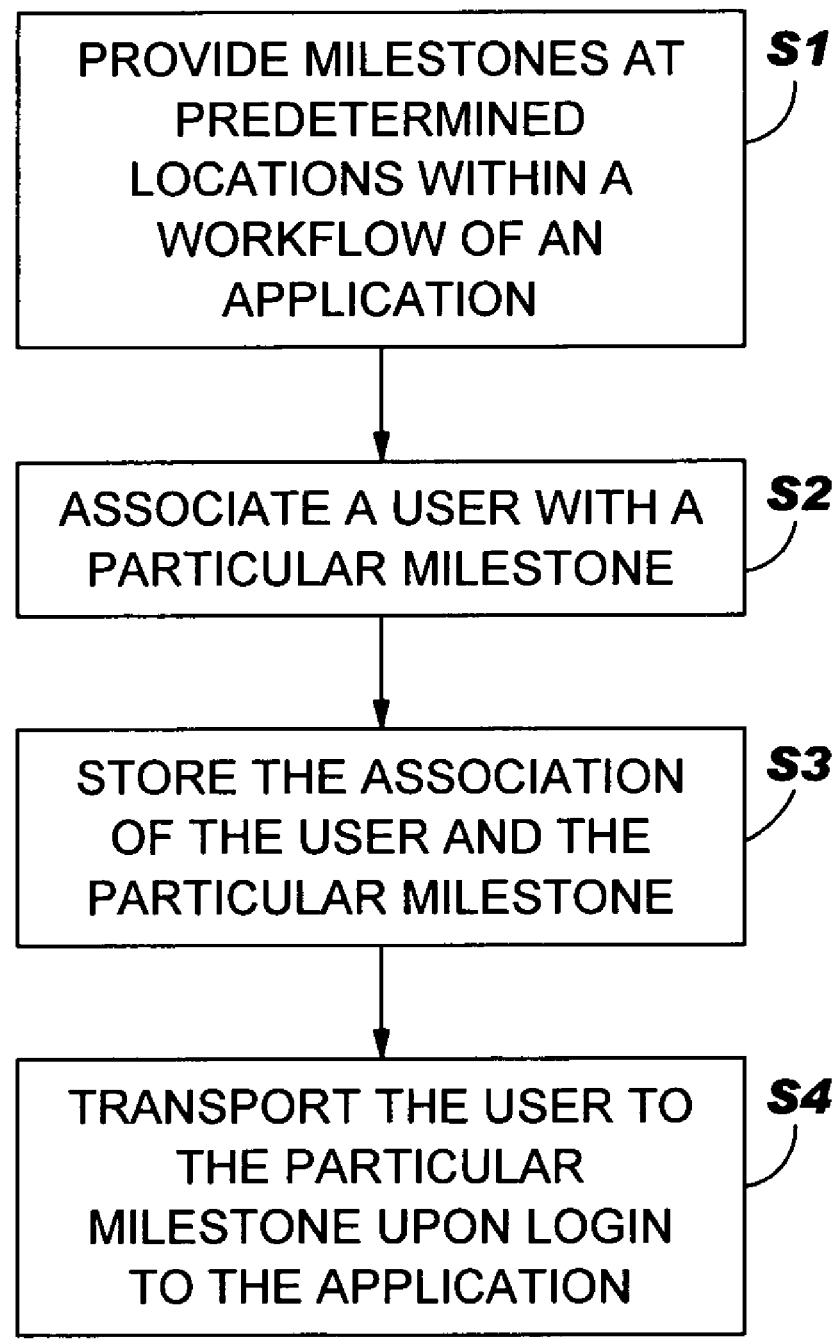

METHOD, SYSTEM AND PROGRAM PRODUCT FOR PRESERVING A USER STATE IN AN APPLICATION

FIELD OF THE INVENTION

The present invention generally relates to a method, system and program product for preserving a user state in an application. Specifically, the present invention records a state of a user based upon milestones that are provided at predetermined locations within a workflow of the application.

BACKGROUND OF THE INVENTION

As the use of computers becomes more pervasive, an increasing number of people are turning to the World Wide Web to perform everyday functions. For example, today, computer users can order goods/services, pay bills, and obtain information from most computerized devices. To this extent, web applications have become a powerful tool in enhancing the on-line environment. In a typical scenario, the web application is loaded on a server. A user will interact with the web application using a browser loaded on his/her client.

Unfortunately, as efficient and convenient as web applications can be, there are drawbacks. For example, many current web application models are stateless. Specifically, under a stateless model, the progress of a user as he/she maneuvers through the workflow of a web application is not recorded or tracked. Thus, in the event of failure on the server side or the client side, work performed by the user can be lost. This is especially frustrating when the user is forced to start over at the beginning of the application workflow. Further, this could require the user to re-navigate through several pages of the web application to return to the spot he/she left off. It could also require the user to re-enter large amounts of data.

In view of the foregoing, there exists a need for a method, system and program product for preserving a user state in an application. Specifically, a need exists for milestones to be provided at predetermined locations within a workflow of an application. A further need exists for a user to be associated with a particular milestone. Still yet, a need exists for the user to be brought/transported to the particular milestone upon logging into the application.

SUMMARY OF THE INVENTION

In general, the present invention provides a method, system and program product for preserving a user state in an application. Specifically, under the present invention, milestones or points of closure are provided at predetermined locations within a workflow of an application. Typically, the milestones are provided at completion points of tasks in the workflow. To this extent, as the user proceeds through the workflow, he/she is associated with the milestones corresponding thereto. The associations are stored (optionally with any corresponding data) in a persistent storage. In the event of a failure, the milestone associations are used to transport the user back to the last milestone with which he/she was associated.

A first aspect of the present invention provides a method for preserving a user state in an application, comprising: providing milestones at predetermined locations within a workflow of the application; associating a user with a particular milestone; and transporting the user to the particular milestone when the user logs into the application.

A second aspect of the present invention provides a system for preserving a user state in an application, comprising: a milestone system for providing milestones at predetermined locations within a workflow of the application; a user association system for associating a user with a particular milestone; and a user transportation system for transporting the user to the particular milestone when the user logs into the application.

A third aspect of the present invention provides a program product stored on a recordable medium for preserving a user state in an application, which when executed, comprises: program code for providing milestones at predetermined locations within a workflow of the application; program code for associating a user with a particular milestone; and program code for transporting the user to the particular milestone when the user logs into the application.

Therefore, the present invention provides a method, system and program product for preserving a user state in an application.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an illustrative workflow within a web application.

FIG. 3 depicts a method flow diagram according to the present invention.

Figure 1:
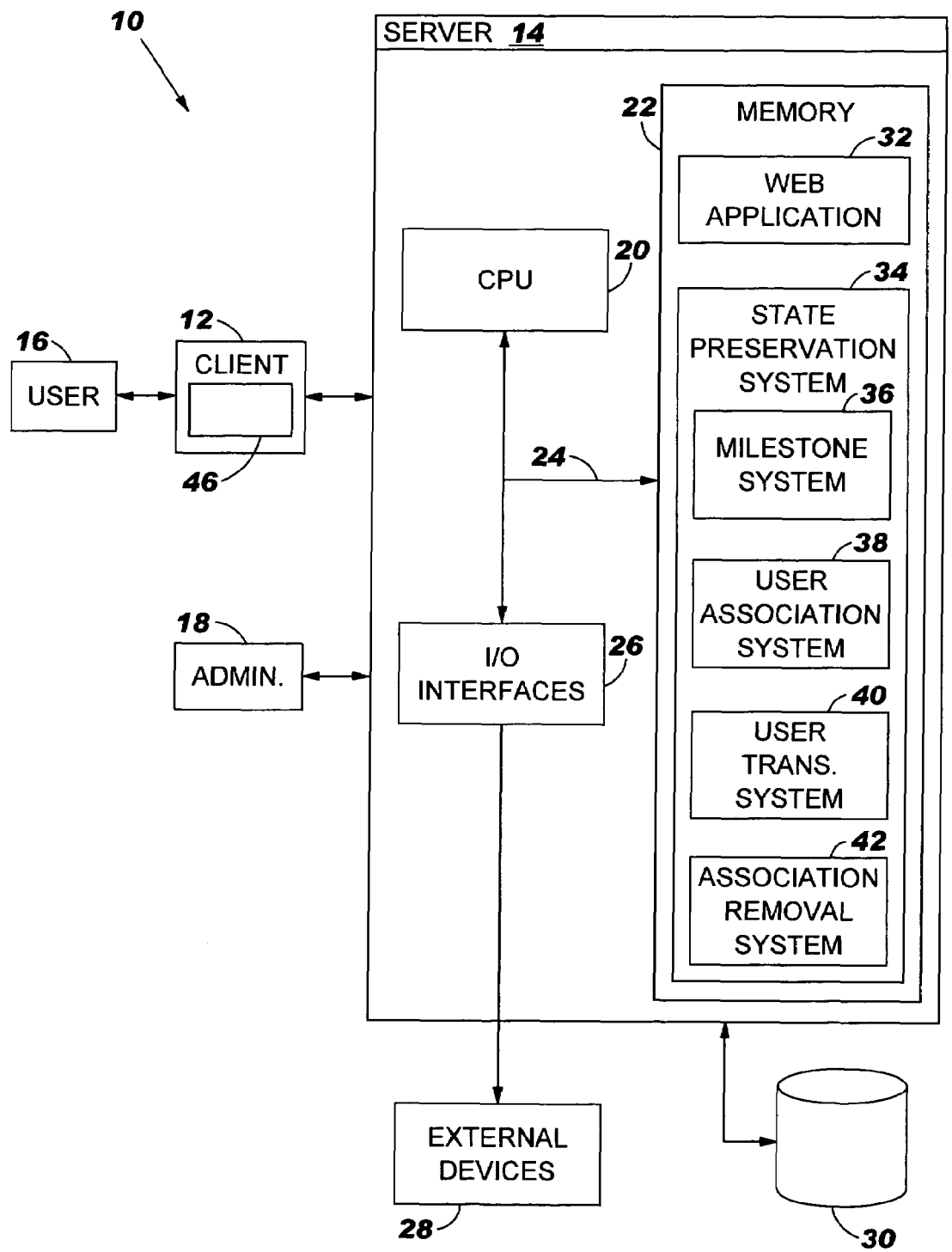
FIG. 1 depicts a system for preserving a user state in an application according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a method, system and program product for preserving a user state in an application. Specifically, under the present invention, milestones or points of closure are provided at predetermined locations within a workflow of an application. Typically, the milestones are provided at completion points of tasks in the workflow. To this extent, as the user proceeds through the workflow, he/she is associated with the milestones corresponding thereto. The associations are stored (optionally with any corresponding data) in a persistent storage. In the event of a failure, the milestone associations are used to transport the user back to the last milestone with which he/she was associated. It should be understood in advance that the term "application" as used herein is intended to refer to any application implemented over a network. For example, the application could be a web application.

Referring now to FIG. 1, a system for preserving a user state in an application according to the present invention is shown. As depicted, system 10 includes client 12 that communicates with server 14. In general, server 14 is intended to represent any type of server (e.g., application server, portal server, etc.) that can host network-based applications such as web application 32. Typically, user 16 will operate browser 46 on client 12 to perform a task using web application 32. For example, web application 32 could be a program that allows user 16 to order goods. Alternatively, web application 32 could provide on-line services such as on-line banking. In any event, client 12 can be any type of computerized device capable of communicating with server 14. For example, client 12 could be a personal computer, a hand held device, a cellular telephone, etc.

The teachings of the present invention are typically implemented in a network environment such as over the Internet, a wide area network (WAN), a local area network (LAN), a virtual private network (VPN), etc. To this extent, communication between client 12 and server 14 could occur via a direct hardwired connection (e.g., serial port), or via an addressable connection that may utilize any combination of wireline and/or wireless transmission methods. Server 14 and client 12 may utilize conventional network connectivity, such as Token Ring, Ethernet, WiFi or other conventional communications standards. Moreover, connectivity could be provided by conventional TCP/IP sockets-based protocol. In this instance, client 12 would utilize an Internet service provider to establish connectivity to server 14.

As depicted, server 14 generally comprises central processing unit (CPU) 20, memory 22, bus 24, input/output (I/O) interfaces 26, external devices/resources 28 and storage unit 30. CPU 20 may comprise a single processing unit, or be distributed across one or more processing units in one or more locations, e.g., on a client and computer system. Memory 22 may comprise any known type of data storage and/or transmission media, including magnetic media, optical media, random access memory (RAM), read-only memory (ROM), a data cache, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, hand-held device, keyboard, mouse, voice recognition system, speech output system, printer, monitor/display, facsimile, pager, etc. Bus 24 provides a communication link between each of the components in server 14 and likewise may comprise any known type of transmission link, including electrical, optical, wireless, etc.

Storage unit 30 can be any system (e.g., a database) capable of providing persistent storage for information under the present invention. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into server 14. Further, it is understood that client 12 will typically include the same components (e.g., CPU, memory, etc.) as shown and described with reference to server 14. These components have not been separately shown or discussed for brevity.

Shown in memory 22 of server 14 is web application 32 and state preservation system 34. It should be understood that web application 32 is shown to illustrate one embodiment of the present invention. As indicated above, the teachings described herein could be implemented in conjunction with any type of network-based application. In any event, state preservation system 34 is provided under the present invention to preserve a state of user 16 as he/she progresses through a workflow of web application 32. To this extent, although not shown, it should be appreciated that state preservation system 34 could be incorporated as part of web application. Web application 32 and state preservation system 34 are shown separate for illustrative purposes only.

Assume in this illustrative embodiment that web application 32 allows user 16 to purchase goods/services on-line using browser 46. In this case, web application 32 will have a particular workflow through which user 16 must proceed. For example, web application 32 will have a certain sequence of web pages and tasks that user must perform. Such tasks could include, for example, establishing an account, navigating pages, selecting goods/services, providing personal information, providing payment information, etc. As is well known, a substantial amount of time could be expended in navigating about a workflow of a web application. Prior to the present invention, failure of client 12 or server 14 caused user 16 to have to re-start the workflow from the beginning. This could require user 16 to re-navigate pages, re-input data, etc.

Under the present invention, milestone system 36 allows an administrator 18 or the like to provide milestones or points of closure at predetermined locations within the workflow of web application 32. Typically, the milestones are provided at the completion of tasks or transactions within the workflow. For example, referring to FIG. 2, an illustrative workflow 50 is shown. As depicted, workflow 50 includes two tasks. Task 52 is for user 16 to provide personal information, while task 54 is for user to provide payment information. Under the present invention, milestone system 36 provides the capability for administrator 18 to provide milestones at predetermined locations within workflow 50. As depicted, milestones 56 and 58 have been provided at the completion of each task. Once milestones are provided, they will be associated with user 16 as he/she proceeds through workflow 50. For example, assume that user 16 has just completed entering his/her personal information. At this point, user association system 38 will associate user 16 with milestone 56. Typically, the association is made by a user identification or the like corresponding to user 16. In any event, once the association is made, it is stored by user association system 38 in a persistent storage such as storage unit 30. For example, storage unit 30 could include a table that cross-references users with milestones. When user 16 later completes the entering of payment information, he/she is associated with milestone 58 by user association system 38. Similar to the previous association, the new association is stored by user association system 38 in storage unit 30. To this extent, the previous association could be maintained in storage unit 30 or overwritten with the new association.

In recording the association of user 16 with a milestone, user association system 38 could also record any data corresponding to the milestone or task. For example, after user 16 has entered his/her payment information, user association system 38 could not only record the association in storage unit 30, but also the actual payment data entered by user 16. In this case, previous associations and corresponding data should not be overwritten, but rather stored along with the current association and data in storage unit 30.

The association of user 16 with a particular milestone is valuable because if client 12 or server 14 fails, user 16 can be transported back to the last milestone with which he/she was associated. For example, assume browser 46 closed inadvertently. Under previous embodiments, user 16 would have to start the workflow all over again. However, under the present invention, upon logging into web application 32 again, user transportation system 40 will access storage unit 30, determine the last milestone with which user 16 was associated, and transport user 16 back to the milestone. Accordingly, if after entering payment information browser 46 closed, user 16 would re-log into web application 32. At that point, user transportation system 40 would determine the applicable milestone (e.g., 58) and transport user 16 thereto. If data was also stored in storage unit by user association system 38, the data would be retrieved and used to populate any applicable fields of the workflow (e.g. fields for task 54). In any event, once user 16 has completed the entire workflow, all associations could be deleted from storage unit 30 by association removal system 42 so that user 16 could begin the workflow at the beginning the next time he/she logged into web application 32.

It should be understood that the association of user 16 with a milestone need not be predicated upon the completion of a task in the workflow of web application 32. For example, before user 16 even initially logs into web application 32, administrator 18 could associate him/her with a particular milestone. Just as with the above-described task completion-based associations, this association would be stored in storage unit 30. When user 16 later logs into web application 32, user transportation system 40 would retrieve the association and transport user 16 to the applicable milestone. A preemptive association such as this could speed the process by which user 16 navigates through the workflow.

Referring now to FIG. 3 a method flow diagram 100 according to the present invention is depicted. As shown, first step S1 is to provide milestones at predetermined locations within a workflow of an application. Second step S2 is to associate a user with a particular milestone. Third step S3 is to store the association of the user and the particular milestone. Fourth step S4 is to transport the user to the particular milestone upon login to the application.

It should be understood that the present invention can be realized in hardware, software, or a combination of hardware and software. Any kind of computer/computer system system (s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for preserving a user state in a single application used to process transactions to a plurality of users in a stateless online environment, comprising:

providing milestones at predetermined locations in the application within a workflow of the application, the application having a series of executable workflow processes and being loaded on a server, each milestone comprising a checkpoint in the runtime execution of the application;

associating a user with a particular milestone; and automatically transporting the user to the particular milestone when the user logs into the application following an interruption in execution of the application.

2. The method of claim 1, wherein the associating step comprises associating the user with a particular milestone based on a user identification.

3. The method of claim 1, further comprising recording the association of the user with the particular milestone in a persistent storage on the server to preserve the user state.

4. The method of claim 3, further comprising recording data corresponding to the particular milestone in the persistent storage.

5. The method of claim 1, wherein the predetermined locations correspond to tasks in the workflow.

6. The method of claim 1, wherein the associating step is performed in response to completion by the user of a task in the workflow corresponding to the particular workflow.

7. The method of claim 1, further comprising deleting all associations upon completion of the workflow by the user, wherein the application is a web application.

* * * * *